(12) United States Patent
Laredo et al.

(10) Patent No.: US 9,390,178 B2
(45) Date of Patent: Jul. 12, 2016

(54) USE OF COLLECTED DATA FOR WEB API ECOSYSTEM ANALYTICS

(71) Applicant: International Business Machines Corporation, Armonk, NY (US)

(72) Inventors: Jim A. Laredo, Katonah, NY (US); Vinod Muthusamy, Toronto (CA); Aleksander Slominski, Riverdale, NY (US); Biplav Srivastava, Noida (IN); Maja Vukovic, NewYork, NY (US); John E. Q. Wittern, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 179 days.

(21) Appl. No.: 14/302,517

(22) Filed: Jun. 12, 2014

(65) Prior Publication Data

US 2015/0363492 A1    Dec. 17, 2015

(51) Int. Cl.
  *G06F 17/30*    (2006.01)
  *G06F 9/54*    (2006.01)

(52) U.S. Cl.
  CPC ............ *G06F 17/30864* (2013.01); *G06F 9/54* (2013.01)

(58) Field of Classification Search
  CPC ....................................................... G06F 17/30
  USPC ................................................. 707/600–899
  See application file for complete search history.

(56) References Cited

U.S. PATENT DOCUMENTS

| | | | |
|---|---|---|---|
| 5,542,078 | A | 7/1996 | Martel et al. |
| 7,058,655 | B2 | 6/2006 | Goldberg et al. |
| 8,074,160 | B2 | 12/2011 | Fry et al. |
| 8,458,596 | B1 | 6/2013 | Malks et al. |
| 2003/0135503 | A1 | 7/2003 | Goldberg et al. |
| 2007/0104100 | A1 | 5/2007 | Davey et al. |
| 2008/0221867 | A1 | 9/2008 | Schreiber |

(Continued)

FOREIGN PATENT DOCUMENTS

| | | |
|---|---|---|
| EP | 0948225 B1 | 7/2008 |
| WO | 2008111051 A2 | 9/2008 |

(Continued)

OTHER PUBLICATIONS

Laredo et al., "Continuous Collection of Web API Ecosystem Data," U.S. Appl. No. 14/302,756, filed Jun. 12, 2014, 32 pages.

(Continued)

*Primary Examiner* — Isaac M Woo
(74) *Attorney, Agent, or Firm* — Yee & Associates, P.C.; Louis J. Percello

(57) ABSTRACT

An embodiment of the invention pertains to Web application programming interface (API) data associated with a Web API ecosystem. The embodiment comprises constructing a data structure that is selectively related to at least some of the Web API data associated with the Web API ecosystem. The embodiment further comprises commencing an analytics operation to determine specified information which is of interest to a given Web API user, wherein the given Web API user has a role that pertains to the Web API ecosystem. Responsive to commencing the operation, Web API data related to the data structure is used to determine one or more preliminary data elements, wherein at least one of the preliminary data elements comprises an answer to a specified preliminary query. Respective preliminary data elements are selectively used to determine the specified information that is of interest to the given Web API user.

18 Claims, 10 Drawing Sheets

(56) References Cited

U.S. PATENT DOCUMENTS

| | | |
|---|---|---|
| 2009/0006152 A1 | 1/2009 | Timmerman et al. |
| 2009/0204594 A1 | 8/2009 | Akkiraju et al. |
| 2009/0235285 A1 | 9/2009 | Kim et al. |
| 2012/0047130 A1 | 2/2012 | Perez et al. |
| 2012/0054065 A1 | 3/2012 | Sung et al. |
| 2014/0090020 A1* | 3/2014 | Meiners ............... H04L 67/34 726/4 |
| 2014/0114805 A1 | 4/2014 | Akolkar et al. |
| 2014/0180868 A1 | 6/2014 | Kanigsberg et al. |
| 2014/0379885 A1 | 12/2014 | Krishnamurthy et al. |
| 2015/0121401 A1 | 4/2015 | Laredo et al. |
| 2015/0268949 A1 | 9/2015 | Huber et al. |
| 2015/0363493 A1 | 12/2015 | Laredo et al. |

FOREIGN PATENT DOCUMENTS

| | | |
|---|---|---|
| WO | 2013056104 A1 | 4/2013 |
| WO | 2013096506 A1 | 6/2013 |

OTHER PUBLICATIONS

Wittern et al., "A Graph-based Data Model for API Ecosystem Insights," Proceedings of the 21 IEEE International Conference on Web Services (ICWS), Jun.-Jul. 2014, 8 pages.

Akolkar et al., "Automatic Modification of Requirements Based on Consumption and Market Changes," U.S. Appl. No. 14/563,104, filed Dec. 8, 2014, 36 pages.

"Cluster analysis," Wikipedia Foundation, Inc., dated Jan. 16, 2014, 17 pages. Accessed Jan. 18, 2014, en.wikipedia.org/wiki/Cluster_analysis.

"Graph Based Recommendation Systems at eBay," Planet Cassandra, Mar. 25, 2013, 18 pages. Accessed Jan. 15, 2014, http://www.slideshare.net/planetcassandra/e-bay-nyc.

"Web API," Wikipedia Foundation, Inc., dated Dec. 7, 2013, 2 pages. Accessed Jan. 14, 2014, en.wikipedia.org/wiki/Web_API.

Belhajjame et al., "PROV-O: The PROV Ontology," W3C, Apr. 30, 2013, 71 pages. Accessed Feb. 10, 2014, http://www.w3.org/TR/prov-o/.

Cohen et al, "A Comparison of String Distance Metrics for Name-Matching Tasks," Proceedings of the Eighteenth International Joint Conference on Artificial Intelligence (IJCAI-03) Workshop on Information Integration, Aug. 2003, pp. 73-78.

Dojchinowski et al., "Personalised Graph-Based Selection of Web APIs," In the Semantic Web—ISWC, Nov. 2012, pp. 34-48.

Foggia et al, "A Graph-Based Clustering Method and Its Applications," Advances in Brain, Vision, and Artificial Intelligence, Jan. 2007, pp. 277-287.

Gantner et al., "RPG: APIs," IBM Redbooks, Dec. 2007, pp. 1-78.

Georgescu, "WSRP-Enabled Distributed Data Mining Services Deliverable over a Knowledge-Driven Portal," Proceedings of the 7th WSEAS International Conference on Applied Computer & Applied Computational Science, Apr. 2008, pp. 150-155.

Huang et al., "Service Recommendation in an Evolving Ecosystem—A Link Prediction Approach," IEEE 20th International Conference on Web Services (ICWS), Jun.-Jul. 2013, pp. 507-514.

Kawaji Et El., "Graph-based clustering for finding distant relationships in a large set of protein sequences," Bioinformatics, vol. 20, No. 2, Jan. 2004, pp. 243-252.

Lee et al., "A Generic Graph-based Multidimensional Recommendation Framework and Its Implementations," Proceedings of the 21st International Conference Companion on worldWide Web, Apr. 2012, pp. 161-165.

Moore et al., "WebSphere Business Integration Server Foundation Using the Programming API and the Common Event Infrastructure," IBM Redbooks, Apr. 2005, 240 pages.

Popov, "Release Update: The new Apiphany Analytics System is here!," Apiphany, Apr. 9, 2013, 4 pages. Accessed Feb. 10, 2014, http://apiphany.com/blog/release-update-the-new-apiphany-analytics-system-is-here.

Rodriguez, "A Graph-Based Movie Recommender Engine," Sep. 22, 2011, 12 pages. Accessed Jan. 15, 2014, http://markorodriguez.com/2011/09/22/a-graph-based-movie-recommender-engine/.

Schaeffer, "Graph clustering," Computer Science Review, vol. 1, No. 1, Aug. 2007, pp. 27-64. geza.kzoo.edu/~erdi/patent/Schaeffer07.

Torres et al., "Improving Web API Discovery by Leveraging Social Information," IEEE International Conference on Web Services (ICWS), Jul. 2011, pp. 744-745.

Wang et al., "Graph-Based Recommendation on Social Networks," IEEE 12th International Asia-Pacific Web Conference (APWEB), Apr. 2010, pp. 116-122.

Xu et al., "A Model-based Approach to Attributed Graph Clustering," Proceedings of the 2012 ACM SIGMOD International Conference on Management of Data, May 2012, 12 pages.

Zhong et al., "MAPO: Mining and Recommending API Usage Patterns," Genoa Proceedings of the 23rd European Conference on ECOOP, Jul. 2009, 25 pages.

Zhou et al., "Graph Clustering Based on Structural/Attribute Similarities," Proceedings of the VLDB Endowment, Aug. 2009, 12 pages.

Laredo et al., "Graph Based Data Model for API Ecosystem Insights," U.S. Appl. No. 14/180,686, filed Feb. 14, 2014, 43 pages.

Cuomo et al., "Supporting Software Application Developers to Iteratively Refine Requirements for Web Application Programming Interfaces," U.S. Appl. No. 14/743,171, filed Jun. 18, 2015, 31 pages.

List of IBM Patents or Patent Applications Treated as Related, 2 pages.

Cuomo et al., "Supporting Software Application Developers to Iteratively Refine Requirements for Web Application Programing Interfaces," U.S. Appl. No. 14/623,156, filed Feb. 16, 2015, 34 pages.

Bianchini et al., "A Multi-perspective Framework for Web API Search in Enterprise Mashup Design," Advanced Information Systems Engineering, Jan. 2013, pp. 353-368.

List of IBM Patents or Patent Applications Treated as Related, 1 page.

Office Action, dated Jan. 22, 2016, regarding U.S. Appl. No. 14/180,686, 33 pages.

Lim et al., "App Epidemics: Modelling the Effects of Publicity in a Mobile App Ecosystem," Artificial Life, vol. 13, Jul. 2012, pp. 202-209.

Nguyen et al., "A Graph-based Approach to API Usage Adaptation," Proceedings of the ACM International conference on Object Oriented Programming Systems Languages and Applications (OOPSLA '10), Oct. 2010, pp. 302-321.

Weiss et al., "Modeling the mashup ecosystem: structure and growth," R&D Management, vol. 40, No. 1, Jan. 2010, pp. 40-49.

Notice of Allowance, dated Apr. 12, 2016, regarding U.S. Appl. No. 14/180,686, 15 pages.

Office Action, dated May 20, 2016, regarding U.S. Appl. No. 14/623,156, 61 pages.

Office Action, dated May 20, 2016, regarding U.S. Appl. No. 14/743,171, 42 pages.

* cited by examiner

FIG. 4

| Role | Insight | Paths to Insight | Result |
|---|---|---|---|
| Consumer $i$ | Which APIs are my contacts using? | $U_i \xrightarrow{contact} U_{1...n}$<br>$U_{1...n} \xrightarrow{invocation} API_{1...m}$ | $API_{1...m}$ |
| Consumer $i$ | Which APIs meet my requirements? | $U_i \xrightarrow{requirement} C_{1...n}$<br>$API_{1...m} \xrightarrow{feature} C_{1...n}$ | $API_{1...m}$ |
| Provider $j$ | Which characteristics are required that I currently do not offer? | $U_j \xrightarrow{provides} API/App_{1...n}$<br>$API/App_{1...n} \xrightarrow{feature} C_{1...m}$<br>$U_{1...k} \xrightarrow{requirement} C_{1...l}$ | $C_{1...l} \setminus C_{1...m}$ |
| Provider $j$ | Who provides APIs/Apps with similar characteristics? | $U_j \xrightarrow{provision} API/App_{1...n}$<br>$API/App_{1...n} \xrightarrow{feature} C_{1...m}$<br>$API/App_{1...k} \xrightarrow{feature} C_{1...m}$<br>$U_{1...l} \xrightarrow{provision} API/App_{1...k}$ | $U_{1...l}$ |
| Ecosystem | Which characteristics are common to successful APIs/Apps? | $U \xrightarrow{invocation > x} API/App_{1...n}$<br>$API/App_{1...n} \xrightarrow{provision} C_{1...m}$ | $C_{1...m}$ |
| Ecosystem | Which often required characteristics are not provided by unsuccessful APIs? | $U \xrightarrow{requirement > x} C_{1...n}$<br>$U \xrightarrow{invocation < y} API/App_{1...m}$<br>$API/App_{1...m} \xrightarrow{provision} C_{1...k}$ | $C_{1...n} \setminus C_{1...k}$ |

| ANALYSIS SUBJECT (502) | QUERY TO ANSWER (504) | REQUIRED EDGES (506) | REQUIRED INPUT (508) |
|---|---|---|---|
| APIs/PATTERNS | WHICH APIs/PATTERNS ARE MY CONTACTS USING? | USER-CONTACT-USER, USER-INVOCATION-API | CURRENT USER |
| APIs/PATTERNS | WHICH APIs/PATTERNS FULFILL MY REQUIRED CHARACTERISTICS? | USER-REQUIREMENT-CHARACTERISTIC, API-PROVISION-CHARACTERISTIC | CURRENT USER REQUIREMENT (e.g., VIA TAG SYSTEM) |
| APIs/PATTERNS | WHICH APIs/PATTERNS ARE USED BY THE PATTERNS THAT I USE? | USER-INVOCATION-PATTERN, PATTERN-INVOCATION-API | CURRENT USER |
| APIs/PATTERNS | WHICH APIs/PATTERNS HAVE SIMILAR CHARACTERISTICS TO THE CURRENT ONE? | API-PROVISION-CHARACTERISTIC | API (e.g., CURRENTLY SELECTED) |
| CHARACTERISTICS | WHICH CHARACTERISTICS ARE MY CONTACTS REQUIRING? | USER-CONTACT-USER, USER-REQUIREMENT-CHARACTERISTIC | CURRENT USER |
| APIs/PATTERNS | WHICH ADDITIONAL APIs/PATTERNS ARE USERS USING THAT USE SIMILAR APIs AS ME? | USER-INVOCATION-API PATTERN | CURRENT USER |

FIG. 5B

| ANALYSIS SUBJECT 510 | QUESTION TO ANSWER 512 | REQUIRED EDGES 514 | REQUIRED INPUT 516 |
|---|---|---|---|
| CHARACTERISTICS | WHICH CHARACTERISTICS ARE (OFTEN) REQUIRED THAT MY API/PATTERN DOES NOT PROVIDE? | USER-PROVIDES-API/PATTERN, API/PATTERN-PROVISION-CHARACTERISTIC, USER-REQUIREMENT-CHARACTERISTIC | CURRENT USER (API PROVIDER) |
| APIs/PATTERNS | WHICH APIs/PATTERNS PROVIDE SIMILAR CHARACTERISTICS TO MINE? | USER-PROVISION-API/PATTERN, API/PATTERN-PROVISION-CHARACTERISTIC | CURRENT USER (API PROVIDER) |
| CHARACTERISTICS | WHICH CHARACTERISTICS DO USERS OF MY API/PATTERN REQUIRE THAT I DO NOT FULFILL? | USER-INVOCATION-API/PATTERN, USER-REQUIREMENT-CHARACTERISTIC, API/PATTERN-PROVISION-CHARACTERISTIC | CURRENT USER (API PROVIDER) |

FIG. 5C

| ANALYSIS SUBJECT {518} | QUERY TO ANSWER {520} | REQUIRED EDGES {522} |
|---|---|---|
| CHARACTERISTICS | WHICH CHARACTERISTICS ARE THE MOST PREVALENT? | API/PATTERN-PROVISION-CHARACTERISTIC |
| CHARACTERISTICS | WHICH CHARACTERISTICS ARE REQUIRED BUT NOT PROVIDED? | USER-REQUIREMENT-CHARACTERISTIC, API/PATTERN-PROVISION-CHARACTERISTIC |
| APIs/PATTERNS | WHICH APIs/PATTERNS ARE CENTRAL (MANY USERS, PATTERNS, CHARACTERISTICS, CATEGORIES....)? | ALL |
| APIs/PATTERNS | WHICH APIs/PATTERNS ARE HIGHLY USED? | USER-INVOCATION-API/PATTERN |
| APIs/PATTERNS | WHICH CHARACTERISTICS ARE COMMON TO HIGHLY USED APIs/PATTERNS? | USER-INVOCATION-API/PATTERN, USER-REQUIREMENT-CHARACTERISTIC, API/PATTERN-PROVISION-CHARACTERISTIC |
| APIs/PATTERNS | WHICH APIs/PATTERNS ARE NOT USED? | USER-INVOCATION-API/PATTERN |
| APIs/PATTERNS | WHICH (OFTEN REQUIRED) CHARACTERISTICS ARE NOT PROVIDED BY UNSUCCESSFUL APIs? | USER-INVOCATION-API/PATTERN, USER-REQUIREMENT-CHARACTERISTIC, API/PATTERN-PROVISION-CHARACTERISTIC |

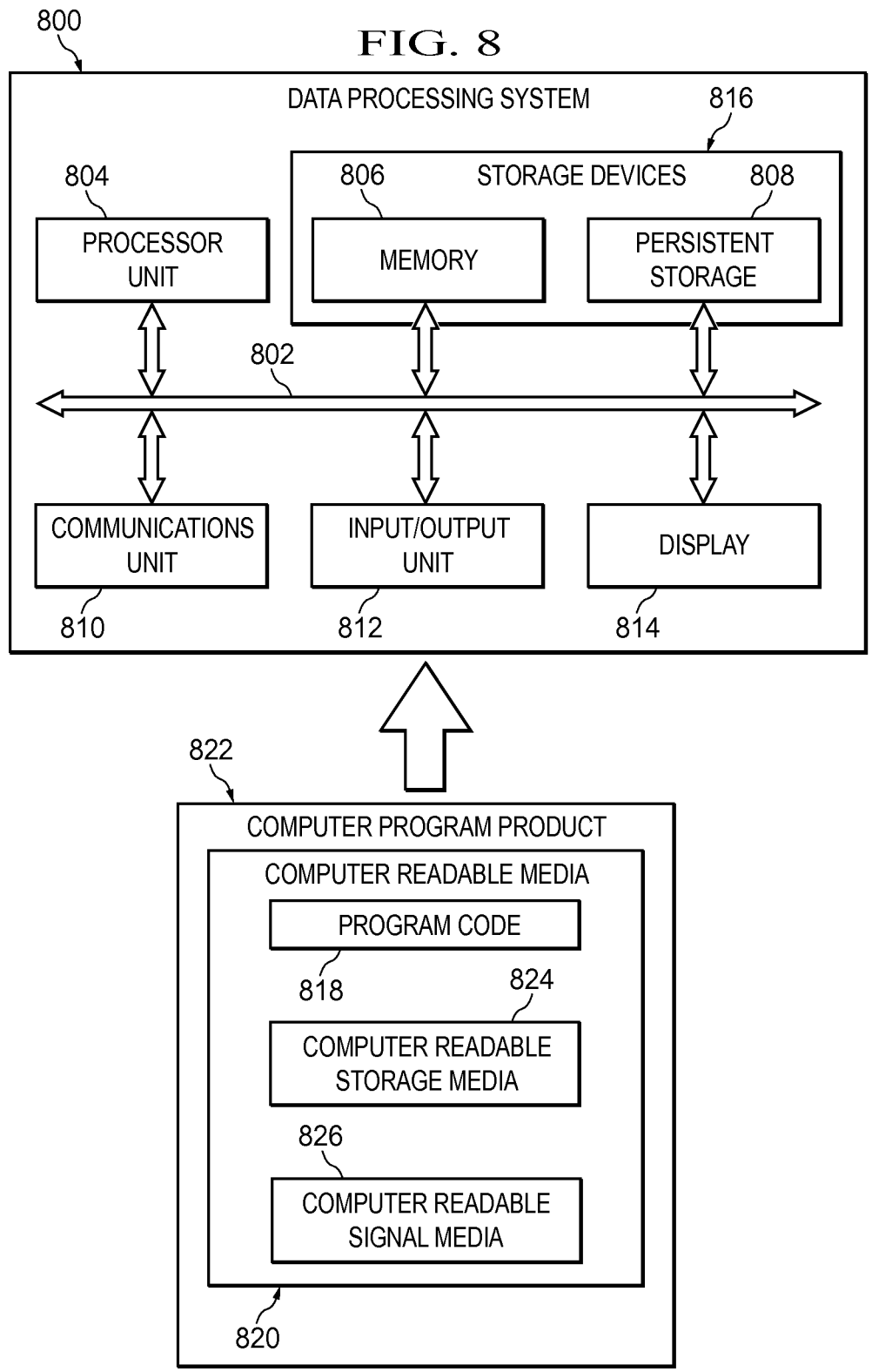

USE OF COLLECTED DATA FOR WEB API ECOSYSTEM ANALYTICS

BACKGROUND

1. Field of the Invention

The invention disclosed and claimed herein generally pertains to collected or acquired data, related to at least one Web application programming interface (API) in a Web API ecosystem. The invention further pertains to use of the acquired data to gain important knowledge and insights, for the benefit of API users. At least some of the acquired data is contained in or otherwise related to an API data graph or other data structure. Embodiments of the invention disclosed herein expressly pertain to APIs that are known as Web APIs, as such term is defined hereinafter.

2. Description of the Related Art

Businesses are increasingly exposing their functionalities through APIs. For example, in excess of 10,000 APIs are currently available through a website known as Programmable Web. Moreover, the type of API known as Web API is emerging as a dominant technology for accessing and integrating applications. As a result, there is a movement away from the Service Oriented Architecture (SOA) form of application integration, which generally needs high upfront technology investments. API ecosystems are emerging to address API promotion and identification, trust, Terms of Service (ToS), Quality of Service (QoS), composability and the like.

The increased interest in APIs, and specifically Web APIs as described above, has encountered a number of challenges. Existing approaches for capturing Web API domain knowledge, as well as consumption models, are only semi-automated and static. These approaches generally crawl existing data at particular points in time, and thus do not acquire pertinent data on a continuing basis. Also, such approaches tend to have predefined schemas to support query related activities. Moreover, the focus of prior art approaches has generally been only on matchmaking and recommending Web APIs for consumers, but not on analyses that also consider Web API providers and Web API ecosystem providers.

SUMMARY

Embodiments of the invention analyze incoming data about Web API events and other related data sources. This data then is used to generate a data structure such as a high level Web API graph, which is capable of answering Web API usage queries. Examples of such queries are provided hereinafter. Also, analytics operations are run periodically to discover clusters, and to create recommendations based on Web API events and the Web API graph. These analytics operations may also use the answers or other results that are provided to the usage queries. Compared to currently used graph clustering and recommendation methods, embodiments of the invention specifically create a Web API graph that supports usage and other queries, and can provide clusters and recommendations useful to API users.

An embodiment of the invention directed to a computer implemented method pertains to Web application programming interface (API) data associated with a Web API ecosystem. The method comprises the step of constructing a data structure that is selectively related to at least some of the Web API data associated with the Web API ecosystem. The method further comprises commencing an analytics operation to determine specified information which is of interest to a given Web API user, wherein the given Web API user has a role that pertains to the Web API ecosystem. Responsive to commencing the operation, Web API data related to the data structure is used to determine one or more preliminary data elements, wherein at least one of the preliminary data elements comprises an answer to a specified preliminary query. Respective preliminary data elements are selectively used in the operation to determine the specified information that is of interest to the given Web API user. At least some of the specified information determined by the analytic operation may be delivered or routed to the data structure, to be stored in relation thereto.

The term "Web API", as defined and used herein, and as known and used by those of skill in the art, means and refers to a server-side API on a Web server. A server-side Web API is a programmatic interface to a defined request-response message system, which is exposed via the web such as by means of an HTTP-based web server. Mashups are Web applications that combine the use of multiple Web APIs of the above type. The term "Web API" may also refer to a client-side API within a web browser.

In view of the above definitions, all uses herein of the terms "API" and "application programming interface" are to be interpreted as referring to, or to mean, "Web API" and "Web application programming interface", respectively. Herein, solely for convenience, "API" may be used rather than the complete term "Web API".

BRIEF DESCRIPTION OF THE SEVERAL VIEWS OF THE DRAWINGS

FIG. 4 is a table illustrating queries and analytic requests that can be implemented using an embodiment of the invention.

FIG. 5A-5C show exemplary queries of interest of Web API consumers, of Web API providers, and of Web API ecosystem providers, respectively.

FIG. 8 is a block diagram showing a computer or data processing system that may be used in implementing embodiments of the invention.

DETAILED DESCRIPTION

Figure 1:
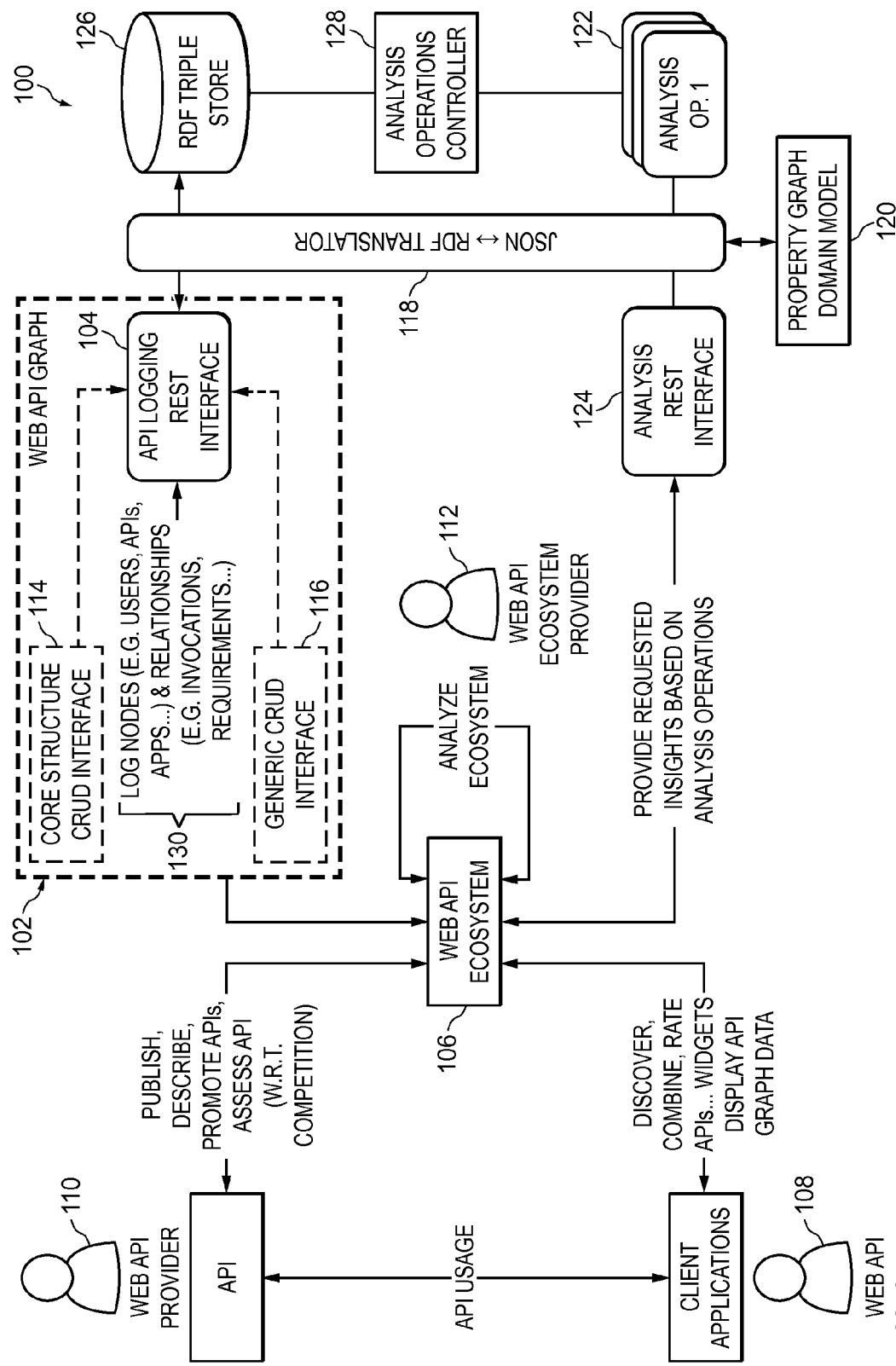
FIG. 1 is a schematic diagram showing components of the architecture of a system for implementing an embodiment of the invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring to FIG. 1, there are shown components and architecture of a system 100, pertaining to an embodiment of the invention. The system 100 includes a Web API graph 102. API graph 102 also has an interface 104, which is described hereinafter in further detail. Moreover, FIG. 1 shows an exemplary Web API ecosystem 106 with which system 100 is associated. FIG. 1 further depicts entities representing the three Web API ecosystem roles described above, that is API consumer 108, API provider 110, and API ecosystem provider 112.

FIG. 1 additionally depicts exemplary activities that each role may carry out with respect to the API ecosystem 106. Thus, API consumer 108 can discover, combine, and rate respective APIs. API consumer 108 can also use widgets to provide tags for APIs, in order to display API graph data. Tags can be keywords, such as "social" or "location-based", or quantitative expressions. When a user creates a tag, a corresponding characteristic node may be created and a feature relationship between the API and the characteristic node is also created.

FIG. 1 shows that API provider 110 interacts with API ecosystem 106 by publishing, describing, promoting, and assessing APIs which it provides, particularly with respect to its competition. API ecosystem provider 112 interacts with API ecosystem 106 by analyzing the ecosystem.

Referring further to FIG. 1, there is shown data 130, of a type to be collected from API ecosystem 106, being transferred to the interface 104 of API graph 102. This data includes node related data for a graph core structure, described hereinafter. The data more specifically includes data pertaining to users, APIs, and applications, and further data comprising relationships. Such data also includes invocations, requirements, features, and provisions. Moreover, some or all of this data needs to be logged or entered into a log file, register, or record, together with appropriate timestamps. Data of the above type is described hereinafter in further detail, in connection with FIG. 2.

In the system of the embodiment of FIG. 1, a log file or record for the above transferred data is usefully provided in a Resource Description Framework (RDF) triple store 126, which is used to persist the data. Representing data in RDF form, as described hereinafter in further detail, is very convenient since RDF data can be reused in a number of other contexts.

In order to translate data of the above type from API graph 102 to RDF triple store 126, at least in part, API graph 102 is implemented as a service, denoting Representational State Transfer (REST) interfaces. Interface 104 is referred to as an API logging REST interface. Interfaces 114 and 116 are two additional REST interfaces, which are both included in or comprise the REST interface 104. Interface 114 is a core structure CRUD (create, read, update, and delete) interface, and interface 116 is a generic CRUD interface.

Core structure CRUD interface 114 exposes entities of the API graph core structure, which include both nodes and relationships. For each node (e.g., user or API), CRUD operations are provided at a designated endpoint (e.g., user or API). Additionally, these endpoints provide CRUD operations for relationships defined in the API graph core structure that originate from these nodes. For example, creation or retrieval of an invocation relationship between user "A" and API "B" can be achieved by performing POST respectively GET to./ user/A/invocation/B. On the other hand, the generic CRUD interface 116 provides CRUD operations for any type of nodes and relationships. This interface allows the API graph 102 to be extended beyond its core structure, by enabling relationships and nodes of any, novel kind to be defined.

The two types of CRUD interfaces 114 and 116 also allow API graph 102 to be integrated with API ecosystem 106. In reaction to events in the ecosystem, corresponding actions can be triggered in the API graph using them. For example, if a new user or API is registered, a user or API node in the API graph can be posted. Or, if a user invokes an API, an invocation relationship between the two can be posted. Thus, a continuous data collection occurs, where events in the ecosystem are reflected in the API graph, and data can readily flow between graph 102 and RDF store 126.

The REST interfaces consume and produce data in Java Script Object Notation (JSON) format, which is useful for transmitting data objects comprising key-value or attribute-value pairs. This is described hereinafter. A resource representing a node contains its type, (e.g., "user"), id (e.g., "user_93"), href in the API graph (e.g., "./user/user_93"), lists of properties (e.g., "name=Erik Wittern"), incoming relationships (e.g., "user_7/contact/user_93") and outgoing relationships (e.g., "user_93/invocation/api_20"). Similarly, a resource representing a relationship contains its type (e.g., "invocation"), id (e.g., "user_93/invocation/api_20"), href in the API graph (e.g., "./user/user_93/invocation/api_20"), source and source href, target and target href, and a list of properties.

The system of FIG. 1 further includes a JSON/RDF translator 118, which is responsible for translating between JSON representation of data and RDF triple store 126, used to persist the data. To carry this out, received JSON data is decoded by the translator to an intermediary property graph domain model 120. In the implementation, domain model 120 uses plain old Java objects (POJOs). The POJOs are then translated to RDF triples, which are persisted in RDF triple store 126. In reverse, when requesting data from the API graph, required triples are retrieved from the RDF triple store using SPARQL queries. JSON/RDF translator 118 populates corresponding POJOs out of the triples, which are encoded in JSON and provided at the REST interfaces.

In order to carry out the above translation, data in the API graph must be represented in RDF form. Utilizing RDF enables the API graph's dataset to be integrated with others, following the idea of open linked data. For example, RDF datasets capturing social relations between users or technical properties of APIs can readily be integrated with the API graph. Similarly, the RDF data representing data from the API graph can thereby be reused in other contexts as well. In RDF, information is stored in triples consisting of a resource, a predicate, and an object. Objects can either be other resources, allowing triples to depict relationships between them, or literals, allowing triples to depict properties of resources. The relationships defined in the API graph's core structure have properties. In RDF, however, predicates cannot in a standard way act as resources of triples, and thus cannot have their own properties. To overcome this problem, embodiments of the invention map the property graph representation of the core structure of API graph 102 to RDF.

More particularly, to represent a given node from the API graph in RDF, a resource representing the given API graph node is defined, wherein each property of both node and edges in the API graph is specified as a key-value pair. Thus, for each property of the given node, a triple originating from that resource is defined whose predicate represents the key of the property and whose literal represents the value of the property. For each relationship of the property graph representation, another resource is defined. Again, to represent properties of the relationship, triples whose objects are literals and that originate from this resource are defined. Thus, at least two triples are required to represent a relationship between two nodes in the property graph, one originating from the source and targeting the relationship, and one originating from the relationship, and targeting the target node. The naming conventions has <relationship name>, and <relationship of> are used for the predicates of these two triples. While this mapping results in an increased number of triples, it allows relationships, represented as resources, to be the origin of as many further descriptive triples as needed.

An example of a key-value pair for an embodiment of the invention, or attribute—value pair, could be the following:

[apig:user_1000, apig:type, apig:Node]

The key or attribute of this key-value pair would be the "type" of user_1000 in an API graph. The value would be "node".

Another example of a key-value pair would be the following:

[apig:api_62/feature/availability, apig:creationdate, "2013-08-16T09:50:33.615-04:00" ^^http://www.w3org/2001/XMLSchema#dateTime]".

The key for this key-value pair would be the creation date and time of availability for API—62 of the API graph. The value would be "2013-08-16T13:55:35.133-04:00".

The API graph as described above can be used to obtain critical insights about API ecosystems, and also about consumption patterns of respective APIs and related applications. This is achieved by carrying out analysis or analytic operations on the API graph, such as by executing selected information queries over the graph entities and relationships. To access analysis operations using the API graph, a dedicated analysis operations interface 124 is provided, which is referred to as an analysis REST interface. This interface 124 furnishes dedicated endpoints for each analysis operation, allowing for example, retrieval of a list of APIs that fulfill some of the user's requirements for characteristics by issuing a GET to../analysis/requirements matching/user ID. Analysis operations 122 are performed by an analysis operations controller 128, which issues required SPARQL queries to RDF triple store 126. Resulting data is translated to JSON by translator component 118 and provided via REST interface 124.

Thus, analysis operations may make use of data pertaining to the Web API ecosystem that was delivered previously to the RDF triple store from the Web API graph. FIG. 1 further shows that results of analysis or analytic operations, such as requested insights or the results of queries, may be provided to API ecosystem 106. Results of analytic operations may also be routed to API graph 102 by translator component 118, as some of the data which is routinely collected by the API graph.

Figure 2:
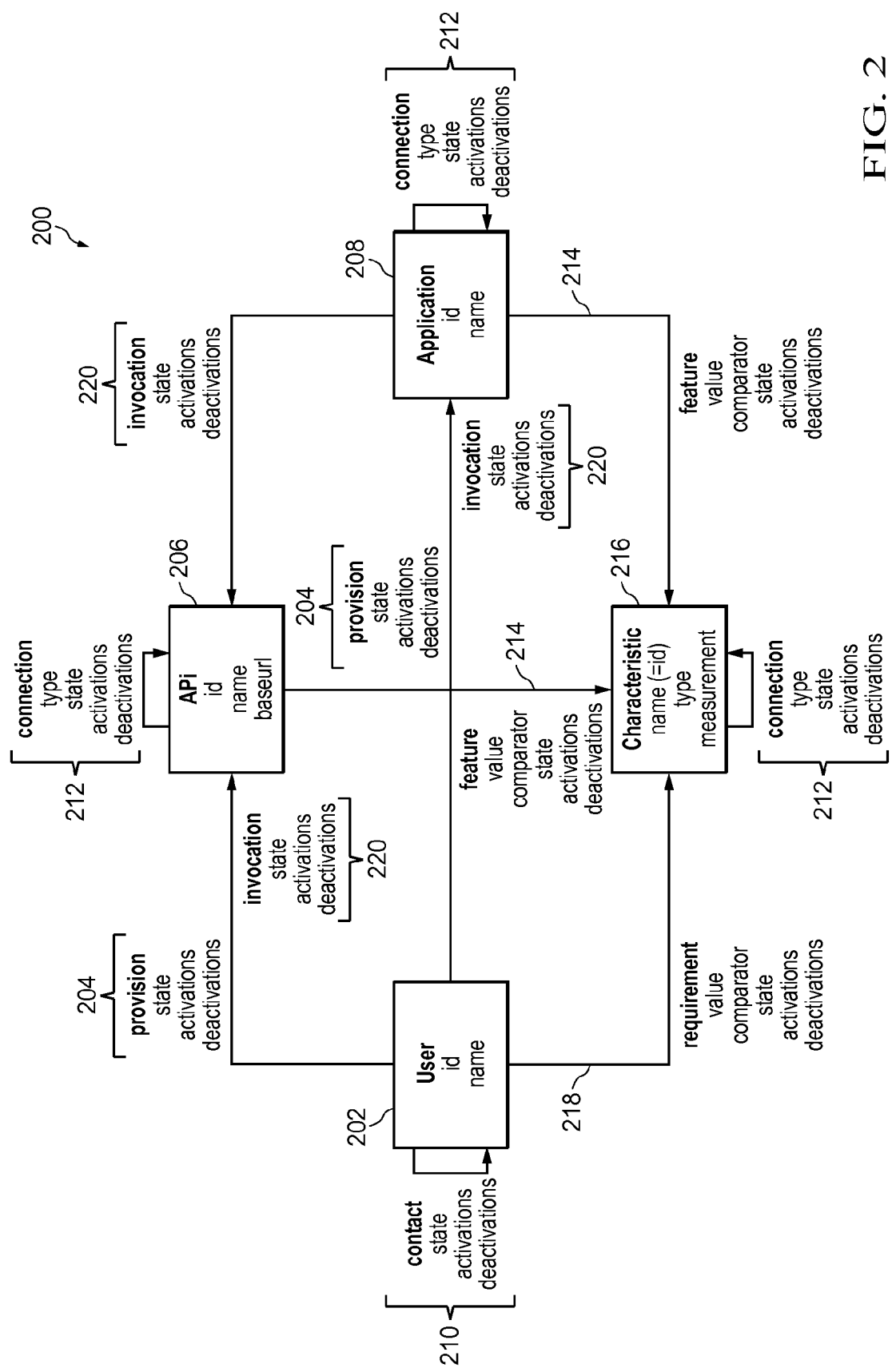
FIG. 2 is a block diagram showing a core structure of a Web API graph for use with the embodiment of FIG. 1.

Referring to FIG. 2, there is shown a unique data structure 200 for an embodiment of the invention. More particularly, FIG. 2 shows an exemplary Web API graph core structure 200 for a Web API graph 102 or the like, wherein core graph 200 comprises a graph-based data model. The Web API core graph 200 captures or collects data which pertains to respective entities included in a Web API ecosystem 106, and also pertains to relationships between such entities. Moreover, the API core graph 200 of FIG. 2 collects data continually, and thus provides a means for continuously collecting all pertinent data needed for an associated Web API ecosystem. This includes data regarding both API features and relationships. Moreover, the API core graph structure is extensible. That is, if elements such as new users, APIs or relationships are added to the API ecosystem, the graph structure 200 can be extended to represent these new elements.

In addition, it is anticipated that an API ecosystem will change or evolve over time. Accordingly, an embodiment of the invention can include the capability of applying temporal or timing information to event data which is captured by the API graph of the data model, wherein the event data indicates changes of various types. A record of these changes thus captures the evolution of the API ecosystem over time. This information timing capability is described hereinafter, in further detail.

Referring further to FIG. 2, graph core structure 200 of the API graph is defined as a property graph, in which both nodes and edges have properties specified as key-value or key-attribute pairs. This graph structure further attempts a balancing act. That is, it intends to perform a set of meaningful analysis operations described hereinafter, while not requiring a verbose and potentially off-putting structure. To achieve this balance, the embodiment of FIG. 2 initially captures fundamental concepts of an API ecosystem, and explicitly allows the data model to evolve over time. FIG. 2 illustrates the nodes and relationships denoting the API graph core structure 200. These elements are also used as the API graph extends, i.e., has additional nodes and relationships added to it.

User node 202 of graph structure 200 represents humans or organizations that interact with a particular API ecosystem. User node 202 has provision relationships 204 or invocation relationships 220 to nodes 206 that represent APIs, or to application nodes 208. Depending on the existence of these relationships, users act either as API providers, API consumers, or both. Between user nodes 202, contact relationships 210 capture social structures, such as that users are friends, or follow the choices of each other. Application nodes 208, representing for example mash-ups (applications) in Programmable Web, also invoke API nodes 206. Both API and application nodes can have connection relationships 212 to denote, for example, dependencies to other APIs or applications.

API and application nodes may also have feature relationships 214 to characteristic nodes 216. Characteristic nodes 216 represent functionalities or non-functionalities that are potentially shared among APIs or applications. For example, characteristic nodes 216 represent categories like "social" or "location-based", data formats like "JSON" OR "XML", or qualities like "cost per request" or "availability". The concrete value that an API 206 or application 208 has with regard to a characteristic node 216 is denoted in the properties of a feature relationship 214. For example, an API's feature relationship 214 to the characteristic "cost per request" with "measurement: $" can denote the properties "value: 0.05" and "comparator: equals". User nodes 202 can have requirement relationships 218 to characteristic nodes 216 that (similar to feature relationships 214) capture quantitative information about the requirement.

To summarize the data storing capabilities of some of the node and edge elements of the API graph described above, when a user signs up to the associated Web API ecosystem, a corresponding node is posted to the API graph core structure 200. When an API is registered to the API ecosystem, a corresponding node is likewise posted to the API graph core structure. A provision relationship between the API node and the node representing the user is also created. Each endpoint of the API is also represented with a corresponding API node. A connection relationship of type "parent API" between the nodes representing the endpoint and the API is created. Thus, it is seen that respective nodes and edges of the API graph, as illustrated by core structure 200, provide a comprehensive repository for storing data that represents respective entities, conditions, states and changes of the associated API ecosystem.

The core structure 200, while comprising a simplified example, still provides a rich set of relationships. This becomes clear when mapping web data, exemplified by Programmable Web data, as the web data is reported to the graph structure. Based on the data, nodes 206 for Web APIs, nodes 208 for mash-ups (applications), and the user nodes 202 who created them, can respectively be created. Invocation relationships 220 between mash-ups and Web APIs, and provision relationships 204 between users and Web APIs and/or mash-ups can also be derived. Further, categories contained in the Programmable Web data can be represented as characteristic nodes 216 with feature relationships 214, from the corresponding Web APIs and/or mash-ups to the characteristics. Thus, by way of example, the complete Programmable Web data is mappable to the API graph, whose core dataset constitutes a superset. Additionally, the API graph allows capturing quantitative information about characteristics (using properties in feature relationships 214 and requirements relationships 218) and keeps track of the invocations 220 a user performs for each Web API and application.

Capturing the required data from a Web API ecosystem is enabled through the system associated with the API graph, which denotes required interfaces to transfer data, such as the interfaces described previously in connection with FIG. 1.

Web API ecosystems are subject to constant change, and correspondingly evolve over time. For example, users, Web APIs, and applications enter and leave the ecosystem, their usage is volatile, and their characteristics change. The Web API graph structure 200 is capable of keeping track of these changes, and can be used in analysis operations that provide the potential to better deal with the changes. For example, Web API providers can detect and react to changing demand or competition, Web API consumers can obtain information about novel Web APIs to consume, and Web API ecosystem providers can gain insights into how the ecosystem evolves over time.

To collect temporal information, all relationships in the Web API graph 200 denote a state property, and capture time stamps of events pertaining to activation and inactivation properties, as illustrated in FIG. 2. More particularly, FIG. 2 explicitly shows that each of the relationships 204, 210-214 and 218-220 has a state property, an activation property and a deactivation property. On creation, a relationship obtains a first activation property, representing the creation date. Subsequent re-establishments of that relationship produce additional activation properties, thus capturing currentness and relevance of the relationship. For example, an invocation relationship 220 keeps track of the evolution of when and to what extent a user node 202 consumes a Web API node 206. With the creation and each re-establishment, the state property of the relationship will be set to active. On the other hand, deletion of a relationship will not result in its data being dismissed. Rather, a deactivation property will capture the time of the deletion, and the state property of the relationship will be set to inactive. Thus, knowledge about the prior existence of a relationship is not lost due to data dismissal. Also, a history, such as frequent changes of the state of a relationship, can reveal patterns of interest. Using this mechanism, relationships may also be marked inactive automatically if they are not established for a certain period of time. One potential concern is the accumulation of data, which could eventually impact performance negatively. To avoid this, ancient data can be summarized, stating for example the amount of re-establishments in a certain time period within one property. Here, a trade-off between the amount of data and its granularity must be chosen by the user.

It will be seen that by capturing the above temporal information, a database of such information is made available, for tracking usage of related Web API ecosystem components. For example, the information could be used to determine whether a given Web API is being consumed more frequently or less frequently, by respective users. More generally, the temporal information could enable users to gain significant insights into evaluation of the ecosystem. Such insights, by way of example, could be directed to how the consumption of a Web API evolved, when a Web API did and did not denote corrections, and how requirements change over time.

As a further example of temporal information, FIG. 2 shows user node 202 having an invocation relationship 220 that could be as follows, by way of example:

| Invocation |
|---|
| activation: 2013/01/04 |
| activation: 2013/04/13 |
| activation: 2013/08/01 |
| activation: 2013/08/02 |
| activation: 2013/08/03 |
| activation: 2013/08/04 |
| . . . |
| deactivation: 2013/08/18 |

This example shows that invocations became frequent in August, 2013. Explicit deactivation of relationship 220 then occurred, possibly because Web API node 206 was substituted with another Web API.

The above example further emphasizes the capability of core structure 200 of the Web API graph to continuously collect data pertaining to interaction events and change events that occur in a Web API ecosystem associated with the Web API graph. For instance, the API of node 206 first became active in the ecosystem on 2013 Jan. 4 and was deactivated from the ecosystem on 2013 Aug. 18. The example also shows that the state of respective elements of the Web API graph at a given time will indicate the state of the comparable elements of the Web API ecosystem at the given time.

As described hereinafter in further detail, a Web API graph having a core structure 200 as described above, together with other components of system 100 as described above in connection with FIG. 1, can be used to resolve issues and problems encountered by those who have respective roles in a Web API ecosystem such as ecosystem 106. For example, those who have the role of providing a given Web API would want to understand how API users are invoking the given API. This may include learning what other APIs are used in conjunction with the given API of the provider, and what types of users and usage patterns are associated with the given API.

An exemplary issue for a Web API consumer could be a desire to understand how a given Web API available in the ecosystem was being used. More particularly, the consumer may want to know what other APIs are typically used together with the given API, what APIs similar users are using, and what the friends of the consumer are doing with respect to the given API.

An exemplary issue for a Web API ecosystem provider could be a need to know which APIs are popular among Web API consumers. This might require determining which APIs were trending, which APIs go together with one another, and how API usage changes over time.

Figure 3:
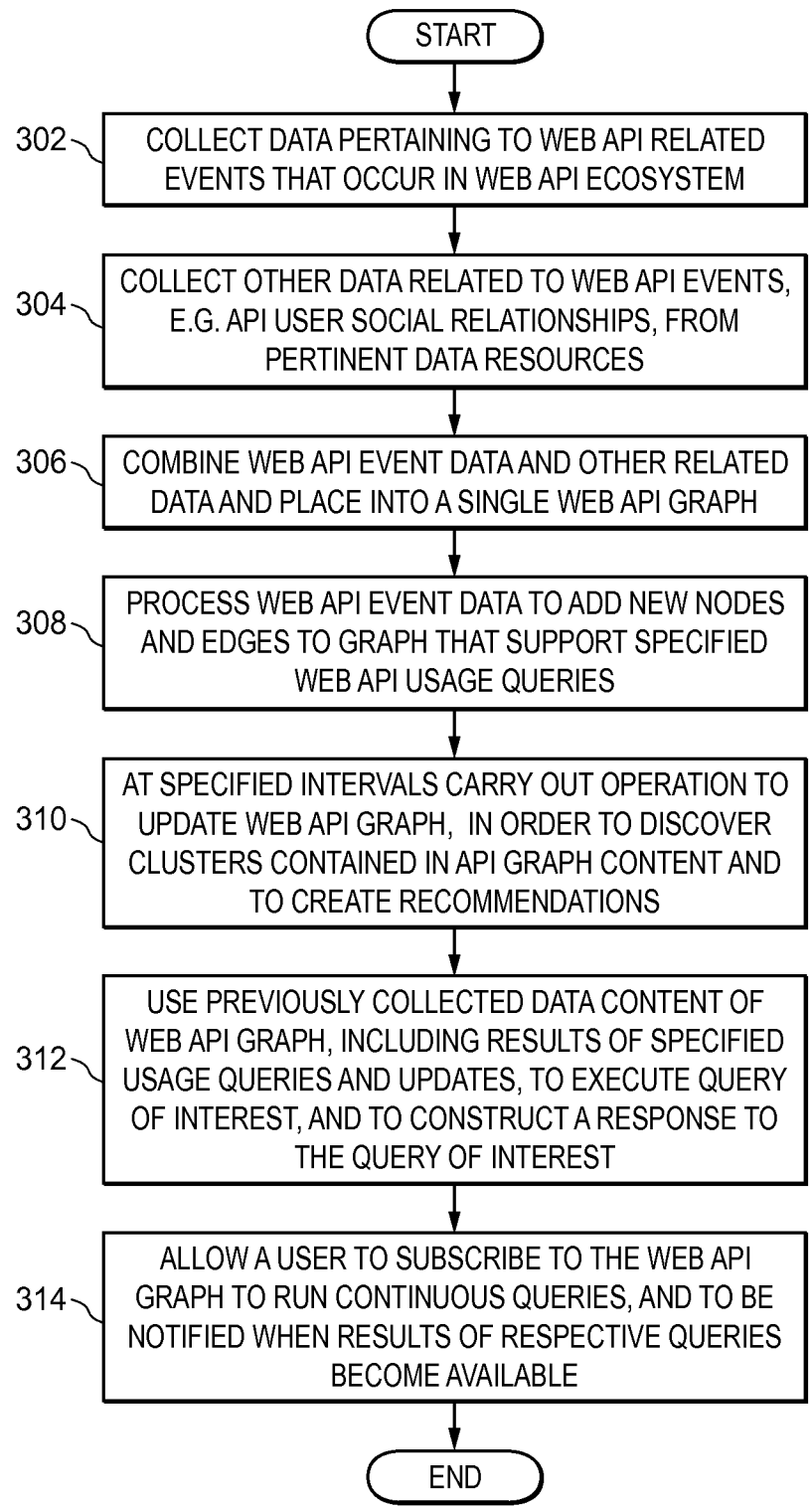
FIG. 3 is a flowchart showing steps of a method using the Web API graph and the system of FIG. 1, in accordance with an embodiment of the invention.

Referring to FIG. 3, there is shown a flowchart depicting steps of a method that can be carried out using components of system 100 or the like, and also using API core graph structure 200, in accordance with an embodiment of the invention. The embodiment is intended to address issues and problems such as those described above, which are encountered by those who have roles in a Web API ecosystem. However, the invention is by no means limited to such embodiment.

At step 302 of FIG. 3, data is continuously collected that pertains to Web API related events, which may occur in Web API ecosystem 103 or the like. The collected data could include, by way of example and not limitation, the data 130 disclosed in connection with FIG. 1. This data includes information regarding users, Web APIs, applications and associated relationships, and further includes events such as Web API invocations, requirements, features and provisions, and registration of Web API users. Relationships could be between a Web API and a Web API user, between different Web API users, and between different Web APIs, without limitation thereto. The collected data could usefully be kept in a log file or database that was located in RDF triple store 126 of FIG. 1.

Step 304 collects other data from pertinent data sources, which is related to the collected Web API event data. Such other data can include, for example, social relationships and associations of Web API users. The other data can also include further contact information 210 for an API user, and connection information 212 for Web APIs and applications, such as shown by FIG. 2.

At step 306, the data collected at both steps 302 and 304 is combined together to construct or enhance a Web API graph structure, such as core graph structure 200. Thus, the collected data can be used to extend the Web API graph from its core structure.

Step 308 processes the collected API event data to add new edges and nodes to the Web API graph, wherein the new edges and nodes are provided to support, or assist in providing answers for, specified API usage queries. For example, a specified usage query could seek to determine "how many times a Web API X was used by a user Y." As described hereinafter in further detail, the answer to a usage query of this type could be very important, in order to carry out an analysis to determine the answer to a broader query of interest. Broader queries could, by way of example, include issues and problems such as those described above, which are encountered by users who have respective roles in the Web API ecosystem.

Step 310, at specified intervals which may be periodic, such as every N hours, or may be aperiodic, carries out an operation to update the Web API graph, wherein the updating analytics may pertain to the whole graph. Each update at this step comprises a map-reduce job that can discover or identify clusters which are contained in the Web API graph content. Clusters of nodes found in the graph, for example, can help a user to quickly identify relationships of graph components that otherwise would be hard to see. The updates can also create recommendations for a user. Moreover it is to be appreciated that step 308 and step 310 each demonstrates an important self-enrichment capability of the Web API graph.

At step 312, the previously collected data content of the Web API graph, as updated at step 310, is used to execute or pursue a query of interest, and to acquire a response to the query of interest. The previously collected data content can include the answers or other results of specified usage queries of step 308, and can also include clusters and recommendations of step 310. Examples of queries of interest are described hereinafter.

Step 314 enables the user to subscribe, in order to gain access to some or all of the data content of the Web API graph. The user can then use the data to run continuous queries of interest to the user, and can be notified when graph data content provides new results. Examples of useful new results can include enhanced visualization, such as having API nodes that are more relevant to the user being displayed larger, or color coding API nodes that have similar characteristics with one another, or that are used by similar types of users.

To summarize the method of FIG. 3, a Web API graph is initially provided, which includes a core graph structure 200 or the like, as shown in FIG. 2. Incoming data pertaining to API events, and also to data sources related to the API events, is collected and analyzed. These efforts are then used to generate a higher level API graph, which is capable of providing answers to preliminary or usage queries that pertain to API usage or characteristics. Such queries are exemplified by the specified usage queries of step 308 of FIG. 3. Moreover, analytic operations may be run periodically to discover component clusters in the graph, and to create recommendations, using the data previously collected for the API graph.

Another perspective of FIG. 3 is that it discloses a method and system wherein a Web API graph structure can interrelate pertinent Web API information that includes, without limitation, APIs, API users, applications, API invocations, social relationships between users, and required and featured characteristics. Moreover, API graph data of the above type can be mined, such as by an analytics operation, to enable API users to discover new insights that can be of great benefit and importance to them. These API users can include those having roles as Web API consumers, providers, and ecosystem providers.

As used herein, the term "insight" includes, without limitation, an answer which is discovered or determined for a query of interest or importance, wherein an answer to the query of interest is sought by a Web API user having a role such as one of the above roles. Examples of insights as defined above are described hereinafter in further detail, in connection with FIG. 4. In a useful embodiment of the invention, insights can be discovered by carrying out an analytics operation applied to data contained in or otherwise a related to a Web API graph, as described herein. Learned or discovered insights and other data resulting from such analytics can then be incorporated into the graph to extend it, or can be stored in association with the graph, such as in RDF store 126 or the like. This further illustrates the self-enrichment of the Web API graph.

Respective components of system 100 shown in FIG. 1 can be used to carry out these analytics operations. Also, an analytics operation can be carried out on top of Web API graph structure that includes results of previous analytic efforts. These analytics operations can be used to answer queries of interest, in order to provide Web API users with corresponding insights, in accordance with step 312. Such efforts also can include determining answers to specified Web API usage queries or other preliminary queries, as described above at step 308 of FIG. 3.

Referring to FIG. 4, there is shown a table pertaining to exemplary use cases 402-412. Each use case is associated with one of the types of API graph users described above, and is concerned with a particular query of interest to that user. By using the API graph to execute respective queries, valuable insights, as defined above, may be realized in regard to Web API ecosystems, and to consumption patterns of Web APIs and applications.

More particularly, the Web API graph can produce insights that are of interest to API providers, consumers, and the ecosystem, in order to drive the API and application (App) consumption. Through search queries or discussions in forums on the API ecosystem, consumers expose their requirements. Such information can be used to identify whether existing APIs and/or applications are in place to enable characteristics that meet the consumer requirements. Similarly, API providers and ecosystem providers can use this information to understand if there are APIs and/or applications with low usage that can be enhanced to incorporate sought after requirements. Insights about what different APIs and applications are enabling help providers obtain insights into the competition and how they can differentiate their offering.

The table of FIG. 4 shows how the API graph can enable these insights. For each sample use case, the table shows the path of a query of interest on an API graph, in order to determine a corresponding insight, and provides a resulting set of nodes representing the insight. For example, if consumers want to know which APIs their business and social contacts are using, the graph structure would be used to traverse the user's contact relationships to other users. From them their relationships to certain APIs could be identified or determined. This insight is then represented by the identified set of APIs. More complex insights, such as the ability to understand which characteristics users seek, could be provided by low usage of particular APIs and/or applications, and may require a number of queries about selected users, characteristics and API consumption levels. Insights such as these are key to understanding how to improve, and what characteristics can drive higher consumption of, APIs and/or applications. These insights also exemplify the term "insight" as used herein.

Use case 402 of the table pertains to API Consumer$_i$, and to the query of interest "Which APIs are my contacts using?" To gain insight by answering this query, Consumer$_i$ can use contact information, for the Consumer$_i$ user node of the API graph, to identify each contact user $U_i$ of Consumer$_i$. These contact users collectively are contacts $U_{i\ldots n}$. Consumer$_i$ then uses data from the API graph to determine that contact users $U_{i\ldots n}$ collectively invoke $API_{1\ldots m}$, which is the desired result.

Use case 404 pertains to API Consumer$_i$ and to the query of interest "Which APIs meet my requirements?" For this query, Consumer$_i$ uses API graph data to determine that its contact users $U_i$ collectively have the requirements $C_{1\ldots n}$. Analysis of API graph data then shows that requirements $C_{1\ldots n}$ can be met by providing respective features of $API_{1\ldots m}$.

Use case 406 pertains to API Provider$_j$ and to the query of interest "Which characteristics are required that I currently do not offer?" API graph data is used to determine that contact users $U_j$ of Provider$_j$ already have APIs and/or applications $API/App_{1\ldots n}$, which offer features or characteristics $C_{1\ldots m}$. Other users $U_{1\ldots k}$ require characteristics $C_{1\ldots l}$. The query of use case 406 can then be resolved by comparing characteristics $C_{1\ldots l}$ and $C_{1\ldots m}$.

Use case 408 pertains to API Provider) and to the query of interest "Who provides APIs and/or applications with similar characteristics?" To answer this query, API graph data is used to determine that Provider$_j$ already provides its contact users $U_j$ with APIs and applications that have the features $C_{1\ldots m}$. The API graph data is used further to determine that the features $C_{1\ldots m}$ are also provided by APIs and applications $API/App_{1\ldots k}$. These are made available by users $U_{1\ldots l}$, which is the result of the query of interest.

Use case 410 pertains to a Web API Ecosystem Provider, and to the query of interest "Which characteristics are common to successful APIs and/or applications?" This query uses API graph data to determine that each of the APIs and applications $API/App_{1\ldots n}$ has a number of user invocation events that exceeds a pre-specified minimum x. The API graph further indicates that each of the $API/App_{1\ldots n}$ has all of the characteristics $C_{1\ldots m}$, which is the result of the query.

Use case 412 pertains to a Web API Ecosystem Provider, and to the query of interest "Which often required characteristics are not provided by unsuccessful APIs?" This query first uses API graph data to identify a set of required characteristics $C_{1\ldots n}$. This is accomplished by analyzing data to determine characteristics that are each required by more than a pre-specified number x of users. The query then identifies a set $API/App_{1\ldots m}$ that each has less than a pre-specified number y of invocation events. The set $API/App_{1\ldots m}$ provides characteristics $C_{1\ldots k}$. The characteristic sets $C_{1\ldots n}$ and $C_{1\ldots k}$ are then compared with each other, to furnish a result for the query of use case 412.

Providing an answer to a query of interest, such as those described above, typically requires answers to or resolutions of one or more preliminary queries or questions. These could be queries pertaining to usage or specified characteristics of a particular Web API. For example, to determine an answer to the query of interest of use case 402, it is first necessary to answer each of the preliminary usage queries. More particularly, each usage query must find out which APIs the contact user $U_i$ is using. The answers to all the preliminary usage queries may then be used in an analytic operation that answers the query of interest.

Implicit or indirect insights are an auxiliary outcome of the API graph. These are analytic operations designed to derive insights from the API graph that can be used to enrich the API graph. For example, API nodes can share a set of characteristics. This information can first be obtained from querying the API graph and then be put back into it, for example, by creating a connection relationship between the API nodes.

Referring to FIG. 5A, there are shown a number of examples of questions or queries of interest, wherein the answers to respective queries could provide insights or other information of great interest to API users that are Web API consumers. Column 502 of FIG. 5A specifies the analysis subject for each query of interest. Column 504 states explicitly each query of interest, or question, that is to be answered. Column 506 indicates the edges of the Web API graph that must be considered in answering each query of interest, and Column 508 indicates the required input for each query.

Referring to FIG. 5B, there are shown a number of examples of questions or queries of interest, wherein the answers to respective queries could provide insights or other information of great interest to API users that are Web API providers. Column 510 of FIG. 5B specifies the analysis subject for each query of interest. Column 512 states explicitly each query of interest that is to be answered. Column 514 indicates the edges of the Web API graph that must be considered in answering each query of interest. Column 516 indicates the required input for each query.

Referring to FIG. 5C, there are shown a number of examples of questions or queries of interest, wherein the answers to respective queries could provide insights or other information of great interest to API users that are Web API ecosystem providers. Column 518 of FIG. 5C specifies the analysis subject for each query of interest. Column 520 states explicitly each query of interest that is to be answered. Column 522 indicates the edges of Web API graph that must be considered in answering each query of interest.

Figure 6:
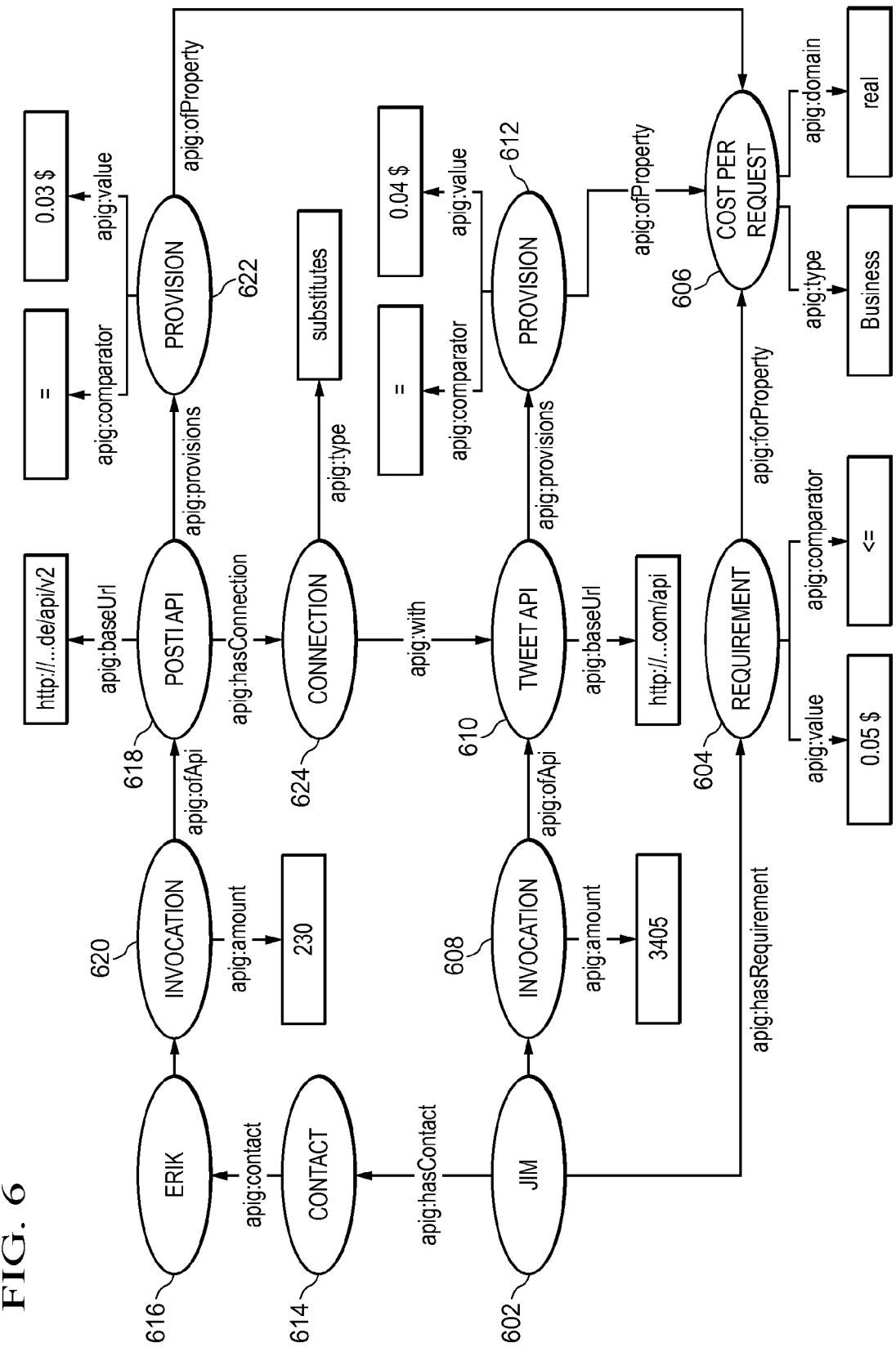
FIG. 6 is a schematic diagram showing how information provided by the Web API graph can be used to implement and answer a query that is of interest to a specified API user.

Referring to FIG. 6, there is shown a schematic diagram that illustrates how particular data contained in or related to a Web API graph, such as graph 200 of FIG. 2, can be used in an analytic operation to answer a specified query of interest of a Web API user. Such queries of interest are exemplified by those described above, but are by no means limited thereto. In the illustrative example of FIG. 6, a Web API user 602, identified as Jim, seeks an answer to the query of interest "Which APIs used by my contact users fulfill my requirements?"

To determine the answer to this query of interest, user 602 submits a request for a corresponding analytic operation. The operation may be carried out by a system such as system 100, having a Web API graph 200. As a first step, the operation must determine the respective requirements of user 602. Using data from the Web API graph 200, such as requirement data 218 and characteristic data 216, it is determined that user 602 has a requirement 604 pertaining to a characteristic or property 606, which is cost per request. The requirement 604 provides specific value data and a comparator for cost per request. Thus, a requirement for API user 602 is that cost per request can be less than or equal to, but may not exceed, 0.05$. Graph data also shows the cost per request property to be of a business type, and to be in a real domain.

In order to comply with requirement 604, FIG. 6 shows API user 602 invoking a Web API 610, known as Tweet API. API graph data discloses the base URL of this API, and invocation 608 indicates 3405 previous invocations of the Tweet API. Provision 612 data from the API graph shows that the Tweet API provides a cost per request that can be less than or equal to, but may not exceed, 0.04$. Accordingly, the Tweet API clearly meets the cost per request requirement of user 602.

Referring further to FIG. 6, contact information 614 of the API graph 200 shows that Web API user 602 has only a single contact user 616, identified as Erik. By further mining and analysis of data related to the API graph, it is found that contact user 616 invokes a Web API 618, known as Posti API, in connection with cost per request property 606. Invocation 620 indicates 230 previous invocations of the Posti API. Provision related data 622 from the graph shows that the Posti API provides a cost per request that can be less than or equal to, but may not exceed, 0.03$. Thus, the Posti API used by contact user 616 fulfills or complies with requirement 604 of user 602. FIG. 6 also shows a connection 624 between the Posti API and the Tweet API.

The analytic operation usefully would then determine whether or not user 602 had any requirements in addition to requirement 604. If not, the final answer provided by the operation, to the above query of interest, would be that the Posti API fulfills the Web API user's requirements. Otherwise, the analytic operation would successively consider all other requirements of the user. For each of these requirements, the operation would search data related to the API graph for pertinent user contact APIs. Each pertinent API found by the search would then be added to the final answer or response that the analytic operation provides to the above query of interest.

Figure 7:
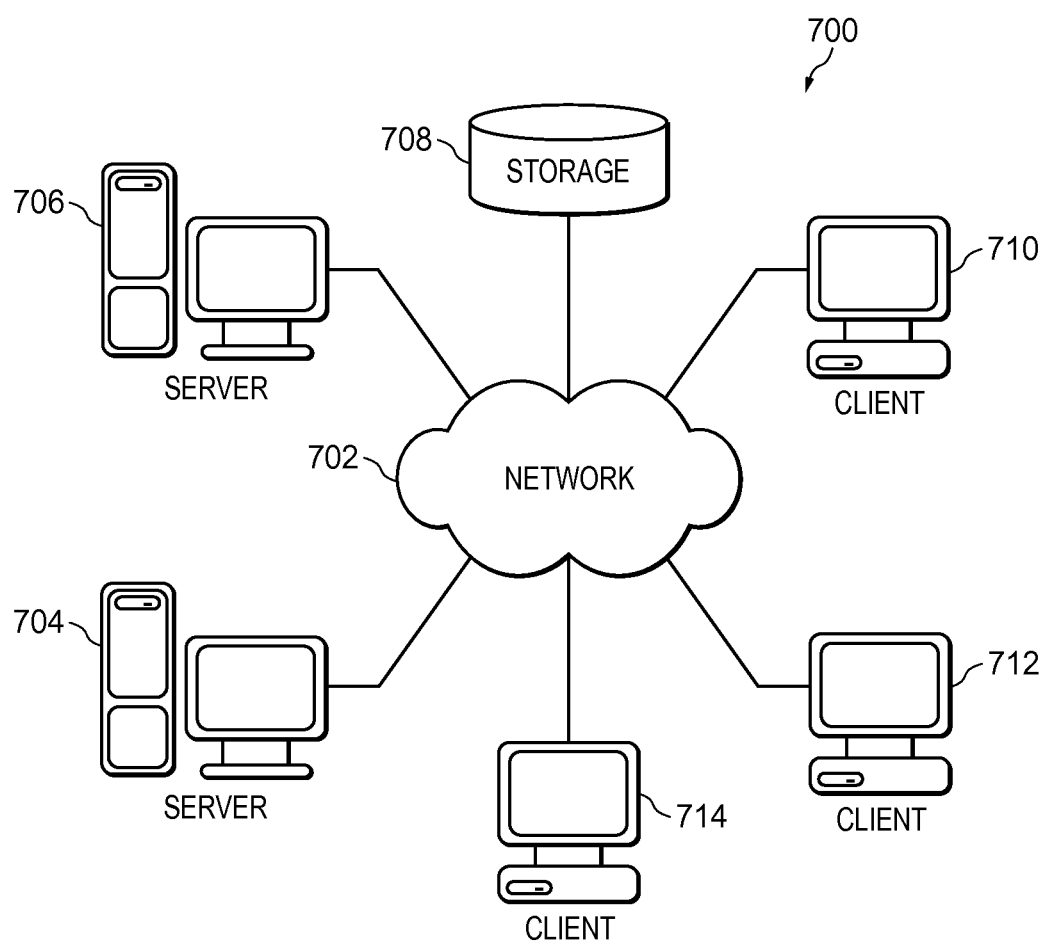
FIG. 7 is a block diagram showing a network of data processing systems in which an embodiment of the invention may be implemented.

FIG. 7 is a pictorial representation of a network of data processing systems in which illustrative embodiments of the invention may be implemented. Network data processing system 700 is a network of computers in which the illustrative embodiments may be implemented. Network data processing system 700 contains network 702, which is the medium used to provide communications links between various devices and computers connected together within network data processing system 700. Network 702 may include connections, such as wire, wireless communication links, or fiber optic cables.

In the depicted example, server computer 704 and server computer 706 connect to network 702 along with storage unit 708. In addition, client computers 710, 712, and 714 connect to network 702. Client computers 710, 712, and 714 may be, for example, personal computers or network computers. In the depicted example, server computer 704 provides information, such as boot files, operating system images, and applications to client computers 710, 712, and 714. Client computers 710, 712, and 714 are clients to server computer 704 in this example. Network data processing system 700 may include additional server computers, client computers, and other devices not shown.

Program code located in network data processing system 700 may be stored on a computer-recordable storage medium and downloaded to a data processing system or other device for use. For example, program code may be stored on a computer-recordable storage medium on server computer 704 and downloaded to client computer 710 over network 702 for use on client computer 710.

In the depicted example, network data processing system 700 is the Internet with network 702 representing a world-wide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 700 also may be implemented as a number of different types of networks, such as, for example, an intranet, a local area network (LAN), or a wide area network (WAN). FIG. 7 is intended as an example, and not as an architectural limitation for the different illustrative embodiments.

Turning now to FIG. 8, an illustration of a data processing system is depicted in accordance with an illustrative embodiment. In this illustrative example, data processing system 800 includes communications fabric 802, which provides communications between processor unit 804, memory 806, persistent storage 808, communications unit 810, input/output (I/O) unit 812, and display 814.

Processor unit 804 serves to process instructions for software that may be loaded into memory 806. Processor unit 804 may be a number of processors, a multi-processor core, or some other type of processor, depending on the particular implementation. "A number," as used herein with reference to an item, means one or more items. Further, processor unit 804 may be implemented using a number of heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices 816. A storage device is any piece of hardware that is capable of storing information, such as, for example, without limitation, data, program code in functional form, and/or other suitable information either on a temporary basis and/or a permanent basis. Storage devices 816 may also be referred to as computer readable storage devices in these examples. Memory 806, in these examples, may be, for example, a random access memory or any other suitable volatile or non-volatile storage device. Persistent storage 808 may take various forms, depending on the particular implementation.

For example, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communications links.

Input/output unit 812 allows for input and output of data with other devices that may be connected to data processing system 800. For example, input/output unit 812 may provide a connection for user input through a keyboard, a mouse, and/or some other suitable input device. Further, input/output unit 812 may send output to a printer. Display 814 provides a mechanism to display information to a user.

Instructions for the operating system, applications, and/or programs may be located in storage devices 816, which are in communication with processor unit 804 through communications fabric 802. In these illustrative examples, the instructions are in a functional form on persistent storage 808. These instructions may be loaded into memory 806 for processing by processor unit 804. The processes of the different embodiments may be performed by processor unit 804 using computer-implemented instructions, which may be located in a memory, such as memory 806.

These instructions are referred to as program code, computer usable program code, or computer readable program code that may be read and processed by a processor in processor unit 804. The program code in the different embodiments may be embodied on different physical or computer readable storage media, such as memory 806 or persistent storage 808.

Program code 818 is located in a functional form on computer readable media 820 that is selectively removable and may be loaded onto or transferred to data processing system 800 for processing by processor unit 804. Program code 818 and computer readable media 820 form computer program product 822 in these examples. In one example, computer readable media 820 may be computer readable storage media 824 or computer readable signal media 826.

Computer readable storage media 824 may include, for example, an optical or magnetic disk that is inserted or placed into a drive or other device that is part of persistent storage 808 for transfer onto a storage device, such as a hard drive, that is part of persistent storage 808. Computer readable storage media 824 also may take the form of a persistent storage, such as a hard drive, a thumb drive, or a flash memory, that is connected to data processing system 800.

In some instances, computer readable storage media 824 may not be removable from data processing system 800. In these examples, computer readable storage media 824 is a physical or tangible storage device used to store program code 818 rather than a medium that propagates or transmits program code 818. Computer readable storage media 824 is also referred to as a computer readable tangible storage device or a computer readable physical storage device. In other words, computer readable storage media 824 is media that can be touched by a person.

Alternatively, program code 818 may be transferred to data processing system 800 using computer readable signal media 826. Computer readable signal media 826 may be, for example, a propagated data signal containing program code 818. For example, computer readable signal media 826 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 818 may be downloaded over a network to persistent storage 808 from another device or data processing system through computer readable signal media 826 for use within data processing system 800. For instance, program code stored in a computer readable storage medium in a server data processing system may be downloaded over a network from the server to data processing system 800. The data processing system providing program code 818 may be a server computer, a client computer, a remote data processing system, or some other device capable of storing and transmitting program code 818. For example, program code stored in the computer readable storage medium in data processing system 800 may be downloaded over a network from the remote data processing system to the computer readable storage medium in data processing system 800. Additionally, program code stored in the computer readable storage medium in the server computer may be downloaded over the network from the server computer to a computer readable storage medium in the remote data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method pertaining to Web application programming interface (API) data which is associated with a Web API ecosystem, the computer implemented method comprising:
   collecting data for a data structure that pertains to Web API related events, wherein the Web API related events selectively include at least registration of a Web API user, provision of a Web API, and invocation of a Web API, and further selectively include relationships between a Web API and a Web API user, between different Web API users, and between different Web APIs;
   constructing the data structure that is selectively related to at least some of the Web API data associated with the Web API ecosystem;
   commencing an analytics operation to determine specified information which is of interest to a given Web API user, wherein the given Web API user has a role that pertains to the Web API ecosystem;
   responsive to commencing the analytics operation, using Web API data related to the data structure to determine one or more preliminary data elements, wherein at least one of the preliminary data elements comprises an answer to a specified preliminary query; and
   selectively using respective preliminary data elements to determine the specified information.

2. The computer implemented method of claim 1, wherein:
   the specified preliminary query comprises a query which pertains to prior use, or to a specified characteristic, selectively, of a particular Web API.

3. The computer implemented method of claim 1, wherein: the given Web API user has the role of a Web API consumer, of a Web API provider, or of a provider of the Web API ecosystem, selectively.

4. The computer implemented method of claim 1, wherein: the data structure comprises a Web API core graph structure having nodes and edges, and previously collected data that pertains to Web API events, and to selected other data, is selectively processed to create one or more new nodes and edges for the data structure.

5. The computer implemented method of claim 1, wherein: the data structure comprises a Web API graph core structure having nodes and edges, wherein a given node selectively comprises a Web API, an application, or a Web API user, and a given edge comprises a relationship that can be at least a relationship between a Web API and a Web API user, a relationship between different Web API users, or a relationship between different Web APIs.

6. The computer implemented method of claim 5, wherein: the Web API graph core structure has at least one node comprising a characteristic node, wherein each characteristic node represents a functionality or a non-functionality that is shared among multiple Web API nodes, selectively, and a Web API user node has a contact relationship with each of one or more other Web API users, and a Web API node has a connection relationship with each of one or more other Web APIs.

7. The computer implemented method of claim 1, further comprising:
updating the data structure at specified intervals, to discover clusters contained in Web API data, and to create recommendations, selectively.

8. The computer implemented method of claim 1, wherein: the analytics operation selectively processes Web API data that was previously acquired in relation to the data structure, in order to determine specified information which comprises an answer to a specified query of interest, and which provides the given Web API user with a specified insight.

9. The computer implemented method of claim 1, wherein: at least some of the specified information determined by the analytics operation is routed to the data structure and stored in relation thereto.

10. The computer implemented method of claim 1, wherein:
a Web API user is enabled to subscribe to use the data structure, in order to run specified continuous queries.

11. The computer implemented method of claim 1, wherein:
a specified interface is provided to translate selected Web API data between the data structure and a specified data store.

12. A computer program product executable in a computer readable storage medium, wherein the computer program product pertains to web application programming interface (API) data which is associated with a Web API ecosystem, and the computer program product comprises:
instructions for collecting data for a data structure that pertains to Web API related events, wherein the Web API related events selectively include at least registration of a Web API user, provision of a Web API, and invocation of a Web API, and further selectively include relationships between a Web API and a Web API user, between different Web API users, and between different Web APIs;
instructions for constructing the data structure that is selectively related to at least some of the Web API data associated with the Web API ecosystem;
instructions for commencing an analytics operation to determine specified information which is of interest to a given Web API user, wherein the given Web API user has a role that pertains to the Web API ecosystem;
instructions for using Web API data related to the data structure, in response to commencing the analytics operation, to determine one or more preliminary data elements, wherein at least one of the preliminary data elements comprises an answer to a specified preliminary query; and
instructions for selectively using respective preliminary data elements to determine the specified information.

13. The computer program product of claim 12, wherein: the specified preliminary query comprises a query which pertains to prior use, or to a specified characteristic, selectively, of a particular Web API.

14. The computer program product of claim 12, wherein: the data structure comprises a Web API core graph structure having nodes and edges, and previously collected data that pertains to Web API events, and to selected other data, is selectively processed to create one or more new nodes and edges for the data structure.

15. The computer program product of claim 12, wherein: the computer program product further comprises instructions for updating the data structure at specified intervals, to discover clusters contained in Web API data, and to create recommendations, selectively.

16. The computer program product of claim 12, wherein: the analytics operation selectively processes Web API data that was previously acquired in relation to the data structure, in order to determine specified information which comprises an answer to a specified query of interest, and which provides the given Web API user with a specified insight.

17. The computer program product of claim 12, wherein: at least some of the specified information determined by the analytics operation is routed to the data structure and stored in relation thereto.

18. A computer system pertaining to Web application programming interface (API) data which is associated with a Web API ecosystem, the computer system comprising:
a bus;
a memory connected to the bus, wherein program code is stored on the memory; and
a processor unit connected to the bus, wherein the processor executes the program code:
to collect data for a data structure that pertains to Web API related events, wherein the Web API related events selectively include at least registration of a Web API user, provision of a Web API, and invocation of a Web API, and further selectively include relationships between a Web API and a Web API user, between different Web API users, and between different Web APIs;
to construct the data structure that is selectively related to at least some of the Web API data associated with the Web API ecosystem;
to commence an analytics operation to determine specified information which is of interest to a given Web API user, wherein the given Web API user has a role that pertains to the Web API ecosystem;
to use Web API data related to the data structure, in response to commencing the analytics operation, to determine one or more preliminary data elements, wherein at least one of the preliminary data elements comprises an answer to a specified preliminary query; and to selectively use respective preliminary data elements to determine the specified information.

* * * * *